United States Patent
Yu

(10) Patent No.: US 9,807,791 B2
(45) Date of Patent: Oct. 31, 2017

(54) RANDOM ACCESS METHOD AND USER EQUIPMENT

(71) Applicant: Huawei Technologies Co., Ltd., Shenzhen (CN)

(72) Inventor: Rongdao Yu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 145 days.

(21) Appl. No.: 14/812,691

(22) Filed: Jul. 29, 2015

(65) Prior Publication Data

US 2015/0334748 A1    Nov. 19, 2015

Related U.S. Application Data

(63) Continuation of application No. PCT/CN2014/071401, filed on Jan. 24, 2014.

(30) Foreign Application Priority Data

Jan. 30, 2013    (CN) .......................... 2013 1 0037513

(51) Int. Cl.
*H04W 74/00* (2009.01)
*H04L 1/18* (2006.01)
(Continued)

(52) U.S. Cl.
CPC ............ *H04W 74/004* (2013.01); *H04B 7/04* (2013.01); *H04L 1/1812* (2013.01); *H04W 8/24* (2013.01); *H04W 74/0833* (2013.01)

(58) Field of Classification Search
CPC ............ H04L 1/1812; H04W 74/0833; H04W 74/004; H04W 52/42; H04W 72/048;
(Continued)

(56) References Cited

U.S. PATENT DOCUMENTS

2008/0062915 A1* 3/2008 Carvalho ............ H04B 7/0623
                                                        370/326
2011/0019694 A1    1/2011 Kwon et al.
(Continued)

FOREIGN PATENT DOCUMENTS

CN    101483626 A    7/2009
CN    102316586 A    1/2012
(Continued)

OTHER PUBLICATIONS

Kang et al., "Method for Transmitting ACK/NACK Signals, and Base Station and User Equipment for the Method", Nov. 3, 2011, WO, WO2011136584 (citations are from machine language translation to English).*

(Continued)

*Primary Examiner* — Paul H Masur
*Assistant Examiner* — Michael Phillips
(74) *Attorney, Agent, or Firm* — Brinks Gilson & Lione

(57) ABSTRACT

The present invention disclose a random access method and user equipment, which relate to the field of communications and improve the transmission efficiency and reliability of a UE for sending a message to a base station in a random access process. The specific solution includes: sending a random access preamble sequence to a base station through a first antenna, so that the base station obtains the antenna number of the UE according to the random access preamble sequence, wherein the first antenna is any antenna of multiple antennas of the UE; judging whether a random access response sent by the base station is received within a preset time threshold; and sending a layer 2 or layer 3 message to the base station by using multiple antennas according to a preset rule if the random access response is received. The present invention is applied to the random access process.

16 Claims, 10 Drawing Sheets

(51) Int. Cl.
*H04B 7/04* (2017.01)
*H04W 8/24* (2009.01)
*H04W 74/08* (2009.01)

(58) Field of Classification Search
CPC ... H04W 74/002; H04W 74/02; H04W 88/02; H04W 8/24; H04B 7/04
See application file for complete search history.

(56) References Cited

U.S. PATENT DOCUMENTS

| | | | | |
|---|---|---|---|---|
| 2011/0126072 A1* | 5/2011 | Yoshimoto | ........... | H04J 11/0043 714/751 |
| 2011/0222521 A1* | 9/2011 | Lee | ............ | H04B 7/0619 370/338 |
| 2011/0268049 A1 | 11/2011 | Luo et al. | | |
| 2011/0287776 A1* | 11/2011 | Vujcic | ............ | H04W 72/048 455/452.1 |
| 2012/0314664 A1 | 12/2012 | Johansson et al. | | |

FOREIGN PATENT DOCUMENTS

| | | | |
|---|---|---|---|
| CN | 102668406 A | | 9/2012 |
| EP | 2 214 445 A1 | | 8/2010 |
| WO | 2010146980 | * | 12/2010 |
| WO | WO 2010/146980 A1 | | 12/2010 |
| WO | WO 2011/053993 A1 | | 5/2011 |
| WO | 2011136584 | * | 11/2011 |

OTHER PUBLICATIONS

Sharp, "Mobile Station Device, Base Station Device, Communication System and Random Access Method", Dec. 23, 2010, WO, WO2010146980 (citations are from machine language translation to English).*

ETRI, "Reliable Transmission of 1$^{st}$ UL Message in Random Access," 3GPP TSG RAN WG1, Meeting #47, Riga, Latvia, Nov. 2006, R1-063518, 3 pages.

* cited by examiner

RANDOM ACCESS METHOD AND USER EQUIPMENT

CROSS-REFERENCE TO RELATED APPLICATIONS

This application is a continuation of International Application No. PCT/CN2014/071401, filed on Jan. 24, 2014 which claims priority to Chinese Patent Application No. 201310037513.5, filed on Jan. 30, 2013, both of which are hereby incorporated by reference in their entireties.

FIELD OF THE INVENTION

The present invention relates to the field of communications, and particularly to a random access method and a user equipment.

BACKGROUND OF THE INVENTION

With the rapid development of mobile communications technologies, the capability of a user equipment (User Equipment, UE) has been constantly enhanced, and the antenna configuration of the UE has been gradually developed from 1 antenna into 2 antennas, 4 antennas, 8 antennas and even more.

In the prior art, when needing to communicate with a network, the UE must firstly access to the network through a random access process and may communicate with the network after successful access, and in this case, the UE may report its own antenna configuration capability to the network, for transmitting information in a subsequent communication process by using multiple antennas. However, in the random access process before the UE communicates with the network, since the network does not know the antenna configuration capability of the UE, the UE could not transmit information in the random access process by using the multiple antennas even if the UE is configured with multiple antennas, thus resulting in that the transmission efficiency and reliability of the UE for sending a message to a base station in the random access process are low, and the user experience is poor.

Therefore, the above-mentioned problem of low transmission efficiency and reliability of the UE for sending the message to the base station in the random access process needs to be solved urgently.

SUMMARY OF THE INVENTION

Embodiments of the present invention provide a random access method and user equipment, which improves the transmission efficiency and reliability of UE for sending a message to a base station in a random access process.

To fulfill the above-mentioned objectives, the embodiments of the present invention adopt the following technical solutions:

A first aspect of the present invention provides a random access method, including:

sending a random access preamble sequence to a base station through a first antenna, so that the base station obtains the antenna number of a user equipment (UE) according to the received random access preamble sequence, wherein the first antenna is any antenna of multiple antennas of the UE;

judging whether a random access response sent by the base station is received within a preset time threshold; and sending a layer 2 or layer 3 message to the base station by using multiple antennas according to a preset rule, if the random access response is received.

In combination with the first aspect, in a possible implementation manner, the method further includes:

resending the random access preamble sequence to the base station through a second antenna, if the random access response is not received, wherein the second antenna is any antenna of the multiple antennas of the UE excluding the first antenna.

In combination with the first aspect and the above-mentioned possible implementation manner, in another possible implementation manner, before the sending a random access preamble sequence to a base station through a first antenna, the method further includes:

selecting the random access preamble sequence from a random access preamble sequence set.

In combination with the first aspect and the above-mentioned possible implementation manner, in another possible implementation manner, before the selecting the random access preamble sequence from a random access preamble sequence set, the method further includes:

receiving a first mapping relationship of the antenna number and the random access preamble sequence sent by the base station, wherein the selecting the random access preamble sequence from a random access preamble sequence set includes:

determining the random access preamble sequence according to the antenna number of the UE and the first mapping relationship.

In combination with the first aspect and the above-mentioned possible implementation manner, in another possible implementation manner, before the sending a random access preamble sequence to a base station through a first antenna, the method further includes:

receiving a second mapping relationship of the antenna number and a random access radio network temporary identifier (RA-RNTI) sent by the base station;

determining a target RA-RNTI necessary for sending the random access preamble sequence according to the antenna number of the UE and the second mapping relationship, so that the UE sends the random access preamble sequence to the base station through the first antenna according to the target RA-RNTI, and the base station determines the antenna number of the UE according to the received random access preamble sequence sent by the UE according to the target RA-RNTI.

In combination with the first aspect and the above-mentioned possible implementation manner, in another possible implementation manner, the sending a random access preamble sequence to a base station through a first antenna, includes:

sending a sequence indicating the antenna number of the UE to the base station through the first antenna by carrying the same in the random access preamble sequence.

In combination with the first aspect and the above-mentioned possible implementation manner, in another possible implementation manner, the sending a layer 2 or layer 3 message to the base station by using multiple antennas according to a preset rule, includes:

determining a transmit diversity scheme according to the antenna number of the UE; and sending the layer 2 or layer 3 message to the base station by using multiple antennas according to the transmit diversity scheme.

In combination with the first aspect and the above-mentioned possible implementation manner, in another possible implementation manner, after the sending the layer 2 or layer 3 message to the base station by using multiple antennas according to the transmit diversity scheme, the method further includes:

receiving an acknowledgement signal sent by the base station, so that the UE obtains that the base station successfully receives the layer 2 or layer 3 message.

In combination with the first aspect and the above-mentioned possible implementation manner, in another possible implementation manner, after the sending the layer 2 or layer 3 message to the base station by using multiple antennas according to the transmit diversity scheme, the method further includes:

receiving a non-acknowledgement indication signal sent by the base station; and performing hybrid automatic repeat request (HARQ) transmission of the layer 2 or layer 3 message in a multi-antenna polling manner according to the transmit diversity scheme.

A second aspect of the present invention provides a random access method, including:

receiving a random access preamble sequence sent by a user equipment (UE);

determining the antenna number of the UE according to the random access preamble sequence; and receiving a layer 2 or layer 3 message sent by the UE through multiple antennas.

In combination with the second aspect, in a possible implementation manner, before the receiving a random access preamble sequence sent by a user equipment (UE), the method further includes:

sending a first mapping relationship of the antenna number and the random access preamble sequence to the UE, so that the UE determines the random access preamble sequence according to its own antenna number and the first mapping relationship.

In combination with the second aspect and the above-mentioned possible implementation manner, in another possible implementation manner, before the receiving a random access preamble sequence sent by a user equipment (UE), the method further includes:

sending a second mapping relationship of the antenna number and a random access radio network temporary identifier (RA-RNTI) to the UE, so that the UE determines the target RA-RNTI necessary for sending the random access preamble sequence according to its own antenna number and the second mapping relationship, and sends the random access preamble sequence to the base station through the first antenna according to the target RA-RNTI.

In combination with the second aspect and the above-mentioned possible implementation manner, in another possible implementation manner, the receiving a layer 2 or layer 3 message sent by the UE through multiple antennas includes:

determining a transmit diversity scheme according to the antenna number of the UE; and receiving the layer 2 or layer 3 message sent by the UE through multiple antennas according to the transmit diversity scheme.

A third aspect of the present invention provides a user equipment, including:

a first sending unit, configured to send a random access preamble sequence to a base station through a first antenna, so that the base station obtains the antenna number of a user equipment (UE) according to the received random access preamble sequence, wherein the first antenna is any antenna of multiple antennas of the UE;

a judging unit, configured to judge whether a random access response sent by the base station is received within a preset time threshold; and a second sending unit, configured to send a layer 2 or layer 3 message to the base station by using multiple antennas according to a preset rule, if the random access response is received.

In combination with the third aspect, in a possible implementation manner, the first sending unit is further configured to resend the random access preamble sequence to the base station through a second antenna, if the random access response is not received, wherein the second antenna is any antenna in the multiple antennas of the UE excluding the first antenna.

In combination with the third aspect and the above-mentioned possible implementation manner, in another possible implementation manner, the user equipment further includes:

a selecting unit, configured to select the random access preamble sequence from a random access preamble sequence set, before the first sending unit sends the random access preamble sequence to the base station through the first antenna.

In combination with the third aspect and the above-mentioned possible implementation manner, in another possible implementation manner, the user equipment further includes:

a first receiving unit, configured to receive a first mapping relationship of the antenna number and the random access preamble sequence sent by the base station, before the selecting unit selects the random access preamble sequence from the random access preamble sequence set;

the selecting unit includes:

a selecting module, configured to determine the random access preamble sequence according to the antenna number of the UE and the first mapping relationship received by the first receiving unit.

In combination with the third aspect and the above-mentioned possible implementation manner, in another possible implementation manner, the user equipment further includes:

a second receiving unit, configured to receive a second mapping relationship of the antenna number and a random access radio network temporary identifier (RA-RNTI) sent by the base station, before the first sending unit sends the random access preamble sequence to the base station through the first antenna; and a determining unit, configured to determine a target RA-RNTI necessary for sending the random access preamble sequence according to the antenna number of the UE and the second mapping relationship received by the second receiving unit, so that the UE sends the random access preamble sequence to the base station through the first antenna according to the target RA-RNTI, and the base station determines the antenna number of the UE according to the received random access preamble sequence sent by the UE according to the target RA-RNTI.

In combination with the third aspect and the above-mentioned possible implementation manner, in another possible implementation manner, the first sending unit includes:

a first sending module, configured to send a sequence indicating the antenna number of the UE to the base station through the first antenna by carrying the same in the random access preamble sequence.

In combination with the third aspect and the above-mentioned possible implementation manner, in another possible implementation manner, the second sending unit includes:

a determining module, configured to determine a transmit diversity scheme according to the antenna number of the UE; and a second sending module, configured to send the layer 2 or layer 3 message to the base station by using multiple antennas according to the transmit diversity scheme determined by the determining module.

In combination with the third aspect and the above-mentioned possible implementation manner, in another possible implementation manner, the user equipment further includes:

a third receiving unit, configured to receive an acknowledgement signal sent by the base station, so that the UE obtains that the base station successfully receives the layer 2 or layer 3 message, after the second sending module sends the layer 2 or layer 3 message to the base station by using the multiple antennas according to the transmit diversity scheme.

In combination with the third aspect and the above-mentioned possible implementation manner, in another possible implementation manner, the third receiving unit is further configured to receive a non-acknowledgement indication signal sent by the base station after the second sending module sends the layer 2 or layer 3 message to the base station by using multiple antennas according to the transmit diversity scheme.

a retransmission unit, configured to perform hybrid automatic repeat request (HARQ) transmission of the layer 2 or layer 3 message in a multi-antenna polling manner according to the transmit diversity scheme.

The fourth aspect of the present invention provides a base station, including:

a first receiving unit, configured to receive a random access preamble sequence sent by a user equipment (UE);

a determining unit, configured to determine the antenna number of the UE according to the random access preamble sequence received by the first receiving unit; and a second receiving unit, configured to receive a layer 2 or layer 3 message sent by the UE through multiple antennas.

In combination with the fourth aspect, in a possible implementation manner, the base station further includes:

a first sending unit, configured to send a first mapping relationship of the antenna number and the random access preamble sequence to the UE before the first receiving unit receives the random access preamble sequence sent by the user equipment (UE), so that the UE determines the random access preamble sequence according to its own antenna number and the first mapping relationship.

In combination with the fourth aspect and the above-mentioned possible implementation manner, in another possible implementation manner, the base station further includes:

a second sending unit, configured to send a second mapping relationship of the antenna number and a random access radio network temporary identifier (RA-RNTI) to the UE before the first receiving unit receives the random access preamble sequence sent by the user equipment (UE), so that the UE determines the target RA-RNTI necessary for sending the random access preamble sequence according to its own antenna number and the second mapping relationship, and sends the random access preamble sequence to the base station through the first antenna according to the target RA-RNTI.

In combination with the fourth aspect and the above-mentioned possible implementation manner, in another possible implementation manner, the second receiving unit includes:

a determining module, configured to determine a transmit diversity scheme according to the antenna number of the UE; and a receiving module, configured to receive the layer 2 or layer 3 message sent by the UE through multiple antennas according to the transmit diversity scheme determined by the determining module.

According to the random access method and the user equipment provided by the embodiments of the present invention, the random access preamble sequence is sent to the base station through the first antenna, so that the base station obtains the antenna number of the UE according to the received random access preamble sequence, and in this case, the UE judges whether the random access response sent by the base station is received within the preset time threshold, and sends the layer 2 or layer 3 message to the base station by using multiple antennas according to the preset rule if the random access response is received. In this way, the UE sends the layer 2 or layer 3 message to the base station by using the multiple antennas, thus improving the transmission efficiency and reliability of the layer 2 or layer 3 message in the random access process.

BRIEF DESCRIPTION OF THE DRAWINGS

To illustrate the technical solutions in the embodiments of the present invention or in the prior art clearer, a brief introduction on the accompanying drawings which are needed in the description of the embodiments or the prior art is given below. Apparently, the accompanying drawings in the description below are merely some of the embodiments of the present invention, based on which other drawings may be obtained by those of ordinary skill in the art without any creative efforts.

DETAILED DESCRIPTION OF THE EMBODIMENTS

A clear and complete description of the technical solutions in the embodiments of the present invention will be given below, in combination with the accompanying drawings in the embodiments of the present invention. Apparently, the embodiments described below are merely a part, but not all, of the embodiments of the present invention. All of other embodiments, obtained by those of ordinary skill in the art based on the embodiments of the present invention without any creative efforts, fall into the protection scope of the present invention.

Figure 1:
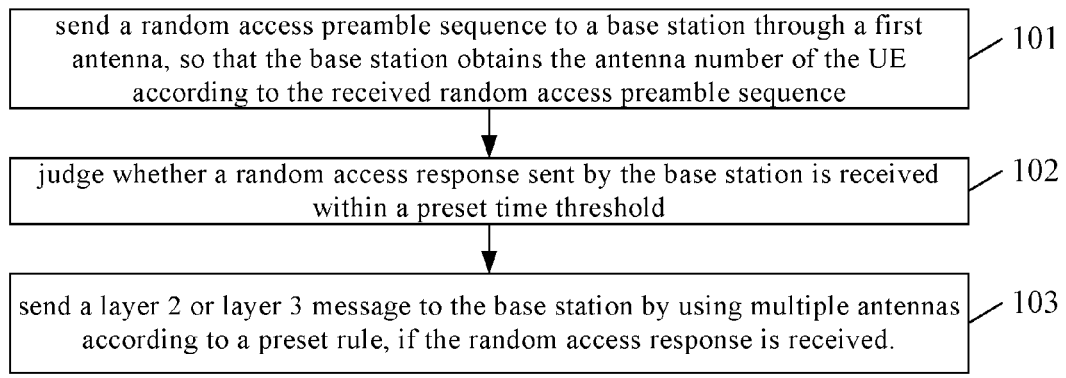
FIG. 1 is a schematic diagram of a flow of a random access method provided by an embodiment of the present invention.

An embodiment of the present invention provides a random access method, and as shown in FIG. 1, the method may include:

101. A UE sends a random access preamble sequence to a base station through a first antenna, so that the base station obtains the antenna number of the UE according to the received random access preamble sequence.

Before sending the random access preamble sequence to the base station, the UE randomly selects an antenna from multiple antennas thereof as the first antenna firstly, and then sends the random access preamble sequence to the base station by using the first antenna. The random access preamble sequence may imply the antenna number of the UE, or may carry a sequence used for indicating the antenna number of the UE, or the random access preamble sequence may be sent in a particular manner, so that the base station obtains the antenna number of the UE according to the received random access preamble sequence.

102. The UE judges whether a random access response sent by the base station is received within a preset time threshold.

After sending the random access preamble sequence to the base station through the first antenna, the UE may detect whether the random access response sent by the base station is received within the preset time threshold.

103. The UE sends a layer 2 or layer 3 message to the base station by using multiple antennas according to a preset rule, if the random access response is received.

If the random access response sent by the base station is received within the preset time threshold, the UE sends the layer 2 or layer 3 message to the base station by using multiple antennas according to the preset rule, so that the base station receives the layer 2 or layer 3 message sent by the UE by using the multiple antennas, thus improving the transmission efficiency and reliability of the layer 2 or layer 3 message.

According to the random access method provided by the embodiment of the present invention, the random access preamble sequence is sent to the base station through the first antenna, so that the base station obtains the antenna number of the UE according to the received random access preamble sequence. In this case, the UE judges whether the random access response sent by the base station is received within the preset time threshold, and sends the layer 2 or layer 3 message to the base station by using multiple antennas according to the preset rule if the random access response is received, and thus the UE sends the layer 2 or layer 3 message to the base station by using the multiple antenna, thus improving the transmission efficiency and reliability of the layer 2 or layer 3 message in the random access process.

Figure 2:
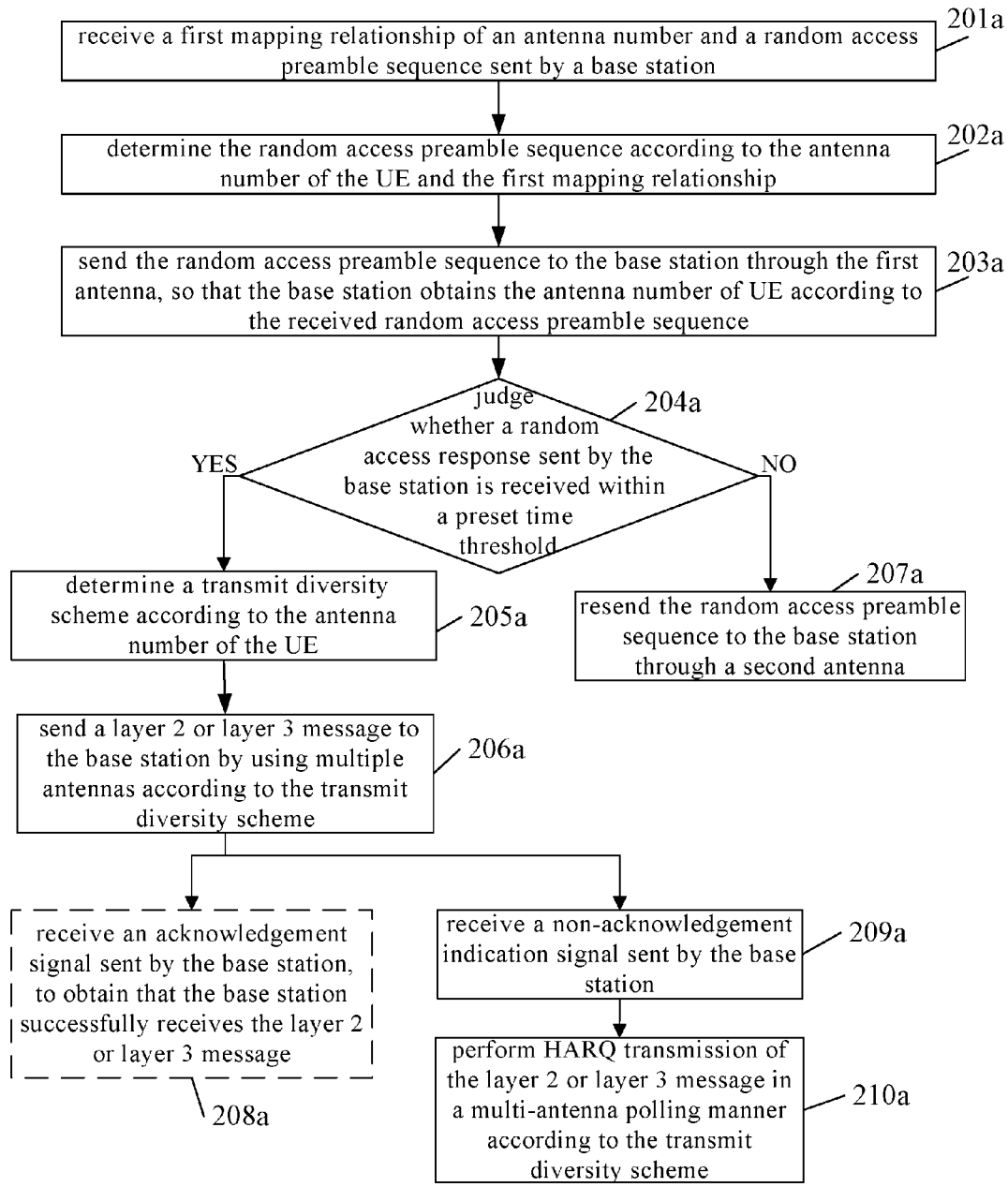
FIG. 2 is a schematic diagram of a flow of a random access method provided by another embodiment of the present invention.

Another embodiment of the present invention provides a random access method, and in the first scenario provided by the embodiment of the present invention, as shown in FIG. 2, the method may include:

201*a*. A UE receives a first mapping relationship of an antenna number and a random access preamble sequence sent by a base station.

With the enhancement of capacity of a UE, the antenna configuration of the UE has been developed from 1 antenna into 2 antennas, 4 antennas, 8 antennas and even more, in order to enable the UE to send a message to the base station through multiple antennas in the random access process, in a scenario provided by the embodiment of the present invention, the UE implies its own antenna number in the random access preamble sequence, and before implying its own antenna number in the random access preamble sequence, the UE may receive the first mapping relationship of the antenna number and the random access preamble sequence, which is broadcasted by the base station through a broadcast channel. For example, taking that one cell supports 64 preamble indexes (Preamble index) as an example, at the early occurrence stage of a novel system supporting UEs with multiple antennas, there are fewer UEs with a configuration of high-order antennas, in this way, fewer preamble indexes may be adopted to correspond to the high-order antennas, and the first mapping relationship of the antenna number and the random access preamble sequence may be as shown in table 1. After the system supporting the UEs with multiple antennas is mature, the UEs with the configuration of high-order antennas are increased, and thus more Preamble indexes may be adopted to correspond to the high-order antennas, and the first mapping relationship of the antenna number and the random access preamble sequence may be as shown in table 2.

TABLE 1

| Preamble index | UE antenna number |
| --- | --- |
| 1~32 | 1 |
| 33~48 | 2 |
| 49~64 | 4 |

TABLE 2

| Preamble index | UE antenna number |
| --- | --- |
| 1~16 | 1 |
| 17~32 | 2 |
| 33~64 | 4 |

When the first mapping relationship of the antenna number and the random access preamble sequence is as shown in table 1, if the random access preamble sequence is any one of 1-32, it indicates that the UE is configured with 1 antenna, if the random access preamble sequence is any one of 33-48, it indicates that the UE is configured with 2 antennas, and if the random access preamble sequence is any one of 49-64, it indicates that the UE is configured with 4 antennas.

It should be noted that, the first mapping relationship of the antenna number and the random access preamble sequence provided in the embodiment of the present invention is merely used as reference, and the specific mapping relationship of the antenna number and the random access preamble sequence is not limited in the embodiment of the present invention.

202a. The UE determines the random access preamble sequence according to the antenna number of the UE and the first mapping relationship.

When receiving the first mapping relationship of the antenna number and the random access preamble sequence sent by the base station, the UE may select the random access preamble sequence from a random access preamble sequence set according to its own antenna number and the first mapping relationship. For example, the first mapping relationship of the antenna number and the random access preamble sequence received by the UE is as shown in table 1, and the UE is configured with 2 antennas. Thus the random access preamble sequence may be any one of 33-48.

203a. The UE sends the random access preamble sequence to the base station through the first antenna, so that the base station obtains the antenna number of user equipment (UE) according to the received random access preamble sequence.

After determining the random access preamble sequence according to its own antenna number and the first mapping relationship, the UE may randomly select an antenna from multiple antennas thereof to send the random access preamble sequence to the base station, and when receiving the random access preamble sequence, the base station may obtain the antenna number of the UE according to the received random access preamble sequence and the first mapping relationship.

204a. The UE judges whether a random access response sent by the base station is received within a preset time threshold, if the random access response is received, implements step 205a and step 206a, and if the random access response is not received, implements step 207a.

After sending the random access preamble sequence implying its own antenna number to the base station, the UE may detect whether the random access response sent by the base station is received within the preset time threshold. If the random access response is received, the UE implements step 205a and step 206a; if the random access response is not received, the UE implements step 207a.

205a. The UE determines a transmit diversity scheme according to the antenna number of the UE.

After receiving the random access response sent by the base station, the UE may obtain its own antenna number through the base station, and in this way, the UE may determine the transmit diversity scheme according to its own antenna number. For example, when the UE is configured with 2 antennas, the transmit diversity scheme is specifically transmitting data according to the following transmission matrix:

$$\begin{bmatrix} s_1 & -s_2^* \\ s_2 & s_1^* \end{bmatrix}$$

The meaning of the transmission matrix for transmitting data by using 2 antennas is as follows: at the first moment, transmitting symbol $s_1$ by using the first antenna, and transmitting symbol $s_2$ by using the second antenna; at the second moment, transmitting symbol $-s_2^*$ by using the first antenna, and transmitting symbol $s_1^*$ by using the second antenna.

For example, when the UE is configured with 4 antennas, the transmit diversity scheme is specifically transmitting data according to the following transmission matrix:

$$\begin{bmatrix} s_1 & -s_2^* & 0 & 0 \\ s_2 & s_1^* & 0 & 0 \\ 0 & 0 & s_3 & -s_4^* \\ 0 & 0 & s_4 & s_3^* \end{bmatrix},$$

wherein, the meaning of the transmission matrix for transmitting data by using 4 antennas is as follows: at the first moment, transmitting symbol $s_1$ by using the first antenna, transmitting symbol $s_2$ by using the second antenna, and sending no data through the third antenna and the fourth antenna; at the second moment, transmitting symbol $-s_2^*$ by using the first antenna, transmitting symbol $s_1^*$ by using the second antenna, and sending no data through the third antenna and the fourth antenna; at the third moment, sending no data through the first antenna and the second antenna, transmitting symbol $s_3$ by using the third antenna, and transmitting symbol $s_4$ by using the fourth antenna; at the fourth moment, sending no data through the first antenna and the second antenna, transmitting symbol $-s_4^*$ by using the third antenna, and transmitting symbol $s_3^*$ by using the fourth antenna.

It should be noted that, transmission matrixes for different antenna numbers may refer to the transmission matrix for 2 antennas and the transmission matrix for 4 antennas in the embodiment of the present invention, and will not be repeated redundantly one by one in the embodiment of the present invention.

206a. The UE sends a layer 2 or layer 3 message to the base station by using multiple antennas according to the transmit diversity scheme.

After the UE determines the transmit diversity scheme according to its own antenna number, the UE may send the layer 2 or layer 3 message to the base station by using multiple antennas according to the transmit diversity scheme.

207a. The UE resends the random access preamble sequence to the base station through a second antenna.

If the random access response sent by the base station is not received within the preset time threshold, the UE adds 1 to the number of times of transmitting a preamble, for sending an error report to the system when the current number of times of transmitting the preamble is equal to a preset threshold, the UE may reselect an arbitrary antenna excluding the first antenna from multiple antennas, determine a back-off time delay and resend the random access preamble sequence. In this way, the first antenna may be prevented from being used for transmitting the random access preamble sequence in the case of failure of the first antenna, improving the success rate of transmitting the random access preamble sequence.

After sending the layer 2 or layer 3 message to the base station by using the multiple antennas according to the transmit diversity scheme, the following step 208a or the following step 209a and step 210a may be implemented.

208a. The UE receives an acknowledgement signal sent by the base station, to obtain that the base station successfully receives the layer 2 or layer 3 message.

After the UE sends the layer 2 or layer 3 message to the base station by using the multiple antennas according to the transmit diversity scheme, the base station may obtain the antenna number of the UE according to the received random access preamble sequence sent by the UE and determine the transmit diversity scheme according to the same rule. Then the base station may receive the layer 2 or layer 3 message sent by the UE to the base station by using the multiple antennas and send the acknowledgement signal to the UE after receiving it successfully. In this case, the UE may receive the acknowledgement signal sent by the base station, and thus the UE obtains that the base station successfully receives the layer 2 or layer 3 message.

209a. The UE receives a non-acknowledgement indication signal sent by the base station.

If the base station does not successfully receive the layer 2 or layer 3 message sent by the UE to the base station by using multiple antennas after obtaining the antenna number of the UE according to the received random access preamble sequence sent by the UE and determining the transmit diversity scheme according to the same rule, the base station needs to send the non-acknowledgement indication signal to the UE. In this case, the UE may receive the non-acknowledgement indication signal sent by the base station.

210a. The UE performs hybrid automatic repeat request (Hybrid Automatic Repeat Request, HARQ) transmission of the layer 2 or layer 3 message in a multi-antenna polling manner according to the transmit diversity scheme.

After the UE receives the non-acknowledgement indication signal sent by the base station, to improve the transmission reliability, the UE performs HARQ transmission of the layer 2 or layer 3 message in the multi-antenna polling manner according to the transmit diversity scheme.

For example, the UE is configured with 4 antennas, and the transmission matrix used when the layer 2 or layer 3 message is sent for the first time is:

$$\begin{bmatrix} s_1 & -s_2^* & 0 & 0 \\ s_2 & s_1^* & 0 & 0 \\ 0 & 0 & s_3 & -s_4^* \\ 0 & 0 & s_4 & s_3^* \end{bmatrix},$$

that is, during the first transmission, the first antenna and the second antenna form an Alamouti space frequency block code (Space Frequency Block Code, SFBC) pair $$\begin{bmatrix} s_1 & -s_2^* \\ s_2 & s_1^* \end{bmatrix},$$

the third antenna and the fourth antenna form an Alamouti SFBC pair $$\begin{bmatrix} s_3 & -s_4^* \\ s_4 & s_3^* \end{bmatrix}.$$

In this case, after receiving the non-acknowledgement indication signal sent by the base station, the UE needs to retransmit the layer 2 or layer 3 message, and the transmission matrix used during the first retransmission may be $$\begin{bmatrix} s_1 & -s_2^* & 0 & 0 \\ 0 & 0 & s_3 & -s_4^* \\ s_2 & s_1^* & 0 & 0 \\ 0 & 0 & s_4 & s_3^* \end{bmatrix},$$

that is, during the first retransmission, the first antenna and the third antenna form an Alamouti SFBC pair $$\begin{bmatrix} s_1 & -s_2^* \\ s_2 & s_1^* \end{bmatrix},$$

the second antenna and the fourth antenna form an Alamouti SFBC pair $$\begin{bmatrix} s_3 & -s_4^* \\ s_4 & s_3^* \end{bmatrix};$$

if the non-acknowledgement indication signal sent by the base station is still received, the second retransmission is continued, and the transmission matrix used during the second retransmission may be $$\begin{bmatrix} s_1 & -s_2^* & 0 & 0 \\ 0 & 0 & s_3 & -s_4^* \\ 0 & 0 & s_4 & s_3^* \\ s_2 & s_1^* & 0 & 0 \end{bmatrix},$$

that is, during the second retransmission, the first antenna and the fourth antenna form an Alamouti SFBC pair $$\begin{bmatrix} s_1 & -s_2^* \\ s_2 & s_1^* \end{bmatrix},$$

the second antenna and the third antenna form an Alamouti SFBC pair $$\begin{bmatrix} s_3 & -s_4^* \\ s_4 & s_3^* \end{bmatrix}.$$

The above-mentioned transmission is repeated until an acknowledgment indication sent by the base station is received. In this way, a diversity gain may be obtained by performing polling of different antennas to form SFBC groups, so as to improve the transmission reliability.

Figure 3:
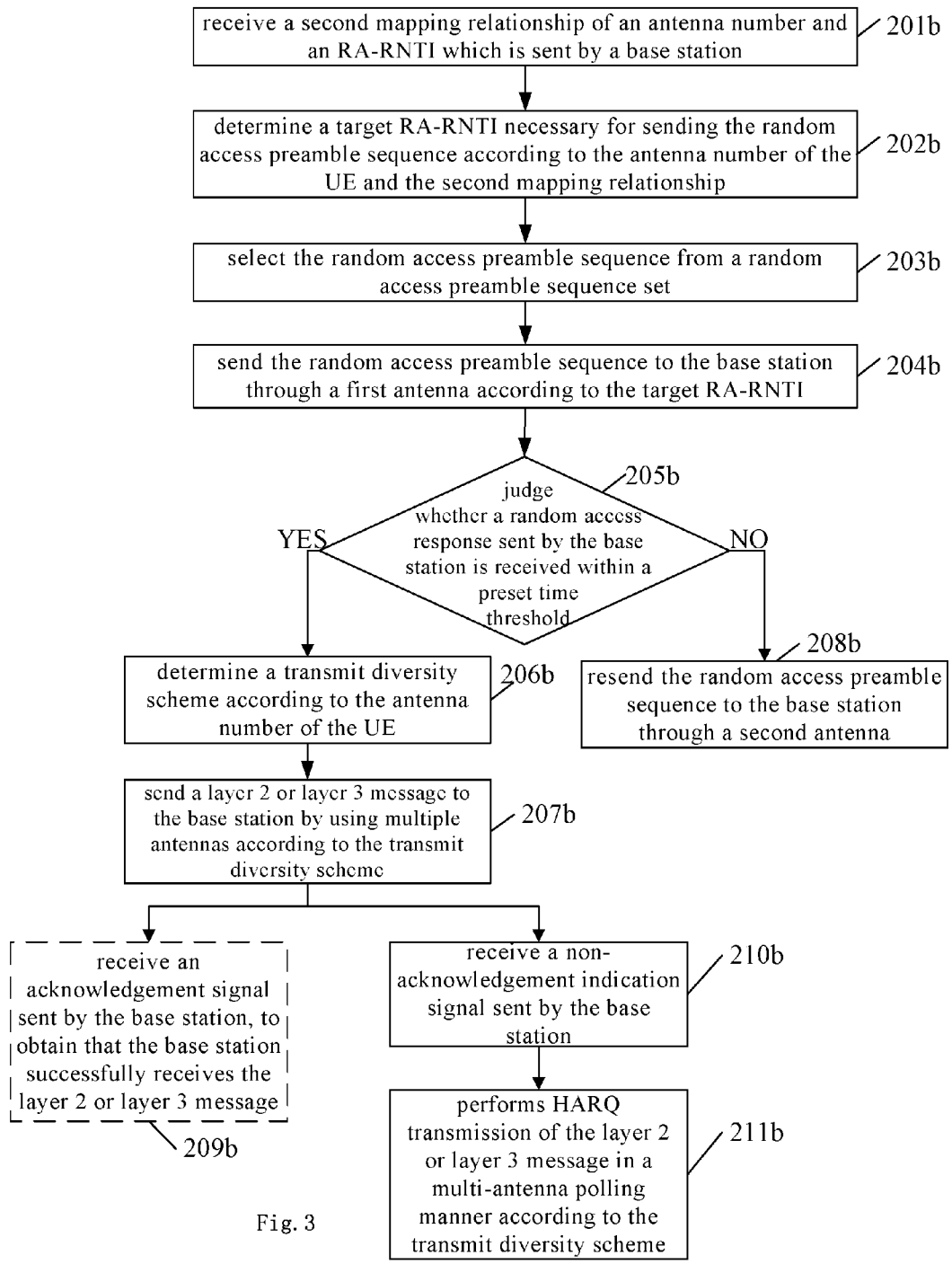
FIG. 3 is a schematic diagram of a flow of anther random access method provided by another embodiment of the present invention.

In the second scenario provided by the embodiment of the present invention, as shown in FIG. 3, the method may include:

201b. A UE receives a second mapping relationship of an antenna number and a random access radio network temporary identifier (Random Access Radio Network Temporary Identifier, RA-RNTI), which is sent by a base station.

In another scenario provided by the embodiment of the present invention, the base station may send the second mapping relationship of the antenna number and the RA-RNTI to the UE. In this way, the UE may imply its own antenna number through the RA-RNTI. The RA-RNTI is calculated according to the time when the UE sends the random access preamble sequence and a transmitting frequency, and thus a second mapping relationship of the antenna number and the RA-RNTI which are one-to-one corresponding may be obtained. For example, when the frequency of sending the random access preamble sequence is set to be constant, sending the random access preamble sequence at moment 1 indicates that the antenna number configured to the UE is 1, and the corresponding first RA-RNTI is calculated; sending the random access preamble sequence at moment 2 indicates that the antenna number configured to the UE is 2, and the corresponding second RA-RNTI is calculated; and sending the random access preamble sequence at moment 3 indicates that the antenna number configured to the UE is 4, and the corresponding third RA-RNTI is calculated, and so on. In this way, the base station may obtain the second mapping relationship and broadcast the second mapping relationship through a broadcast channel. Or, the time of sending the random access preamble sequence is set to be constant, sending the random access preamble sequence at frequency band 1 indicates that the antenna number configured to the UE is 1, and the corresponding RA-RNTI is calculated; sending the random access preamble sequence at frequency band 2 indicates that the antenna number configured to the UE is 2, and the corresponding RA-RNTI is calculated; and sending the random access preamble sequence at frequency band 3 indicates that the antenna number configured to the UE is 4, and the corresponding RA-RNTI is calculated. In this way, the second mapping relationship may also be obtained. Or, the time when the UE sends the random access preamble sequence and the transmitting frequency may also be combined to obtain more corresponding relationships, etc.

It should be noted that, the second mapping relationship of the antenna number and the RA-RNTI is not specifically limited in the embodiment of the present invention, and those skilled in the art may make a rule according to actual conditions.

202b. The UE determines a target RA-RNTI necessary for sending the random access preamble sequence according to the antenna number of the UE and the second mapping relationship.

After receiving the second mapping relationship of the antenna number and the RA-RNTI sent by the base station, the UE may determine the target RA-RNTI necessary for sending the random access preamble sequence according to its own antenna number and the second mapping relationship.

203b. The UE selects the random access preamble sequence from a random access preamble sequence set.

The UE may randomly select a random access preamble sequence from a preset random access preamble sequence set as the random access preamble sequence.

204b. The UE sends the random access preamble sequence to the base station through a first antenna according to the target RA-RNTI.

After determining the target RA-RNTI according to its own antenna number and the second mapping relationship and determining the random access preamble sequence from the random access preamble sequence set, the UE may send the random access preamble sequence to the base station through the first antenna according to the target RA-RNTI. For example, the antenna number configured to the UE is 2, the second mapping relationship is that the frequency of transmitting the random access preamble sequence is constant and the random access preamble sequence is sent at different moments under different antenna numbers (for example, sending the random access preamble sequence at moment 1 indicates that the antenna number configured to the UE is 1, sending the random access preamble sequence at moment 2 indicates that the antenna number configured to the UE is 2, and sending the random access preamble sequence at moment 3 indicates that the antenna number configured to the UE is 4). Then, the UE may send the random access preamble sequence to the base station through the first antenna at moment 2 by using a preset transmitting frequency.

205b. The UE judges whether a random access response sent by the base station is received within a preset time threshold. If the random access response is received, implements step 206b and step 207b, and if the random access response is not received, implements step 208b.

206b. The UE determines a transmit diversity scheme according to the antenna number of the UE.

207b. The UE sends a layer 2 or layer 3 message to the base station by using multiple antennas according to the transmit diversity scheme.

208b. The UE resends the random access preamble sequence to the base station through a second antenna.

After sending the layer 2 or layer 3 message to the base station by using multiple antennas according to the transmit diversity scheme, the UE may implement the following step 209b or the following step 210b and step 211b.

209b. The UE receives an acknowledgement signal sent by the base station, to obtain that the base station successfully receives the layer 2 or layer 3 message.

210b. The UE receives a non-acknowledgement indication signal sent by the base station.

211b. The UE performs hybrid automatic repeat request (HARQ) transmission of the layer 2 or layer 3 message in a multi-antenna polling manner according to the transmit diversity scheme.

It should be noted that, in the embodiment of the present invention, the specific description of parameters from step 205b to step 211b may refer to the specific description of the corresponding parameters from step 204a to step 210a in the embodiment of the present invention, and will not be repeated redundantly one by one in the embodiment of the present invention.

Figure 4:
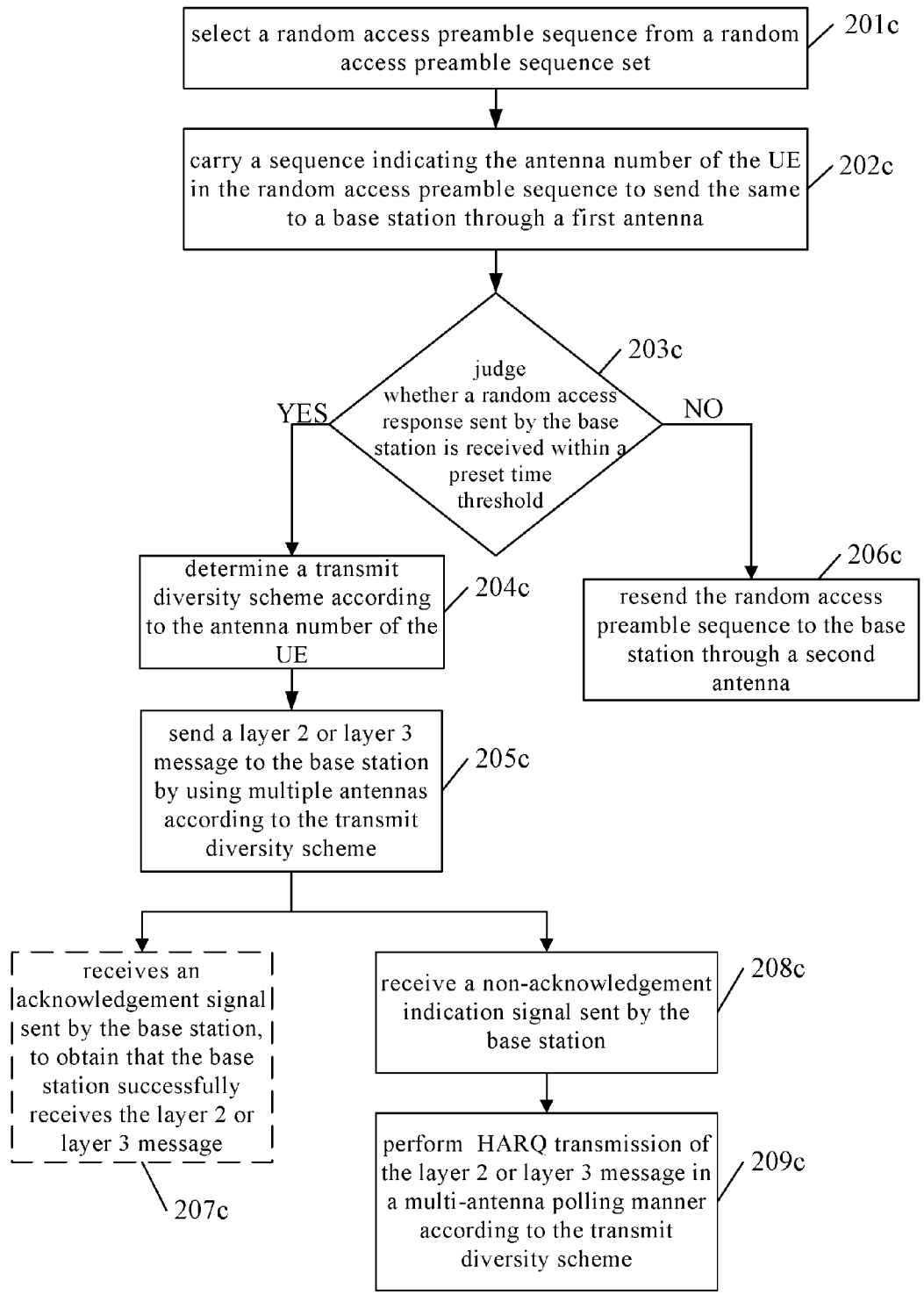
FIG. 4 is a schematic diagram of a flow of still another random access method provided by another embodiment of the present invention.

In the third scenario provided by the embodiment of the present invention, as shown in FIG. 4, the method may include:

201c. A UE selects a random access preamble sequence from a random access preamble sequence set.

The UE may randomly select a random access preamble sequence from a preset random access preamble sequence set as the random access preamble sequence.

202c. The UE carries a sequence indicating the antenna number of the UE in the random access preamble sequence to send the same to a base station through a first antenna.

After selecting the random access preamble sequence, the UE may carry the sequence indicating its own antenna number in the random access preamble sequence to send the same to the base station through the first antenna. For example, the random access preamble sequence carrying the sequence indicating the antenna number of the UE may be as shown in table 3.

TABLE 3

| Preamble index | UE Antenna Number |
|---|---|

Preamble index refers to the random access preamble sequence, and UE Antenna Number refers to the antenna number of the UE.

203c. The UE judges whether a random access response sent by the base station is received within a preset time threshold. If the random access response is received, implements step 204c and step 205c, and if the random access response is not received, implements step 206c.

204c. The UE determines a transmit diversity scheme according to the antenna number of the UE.

205c. The UE sends a layer 2 or layer 3 message to the base station by using multiple antennas according to the transmit diversity scheme.

206c. The UE resends the random access preamble sequence to the base station through a second antenna.

After sending the layer 2 or layer 3 message to the base station by using multiple antennas according to the transmit diversity scheme, the following step 207c or the following step 208c and step 209c may be implemented.

207c. The UE receives an acknowledgement signal sent by the base station, to obtain that the base station successfully receives the layer 2 or layer 3 message.

208c. The UE receives a non-acknowledgement indication signal sent by the base station.

209c. The UE performs hybrid automatic repeat request (HARQ) transmission of the layer 2 or layer 3 message in a multi-antenna polling manner according to the transmit diversity scheme.

It should be noted that, in the embodiment of the present invention, the specific descriptions of parameters from step 203c to step 209c may refer to the specific descriptions of the corresponding parameter from step 204a to step 210a in the embodiment of the present invention, and will not be repeated redundantly one by one in the embodiment of the present invention.

According to the random access method provided by the embodiment of the present invention, the random access preamble sequence is sent to the base station through the first antenna, so that the base station obtains the antenna number of the UE according to the received random access preamble sequence. In this case, the UE judges whether the random access response sent by the base station is received within the preset time threshold, and sends the layer 2 or layer 3 message to the base station by using multiple antennas according to the preset rule if the random access response is received. In this way, the UE sends the layer 2 or layer 3 message to the base station by using the multiple antennas, thus improving the transmission efficiency and reliability of the layer 2 or layer 3 message in the random access process.

Moreover, if failing to send the random access preamble sequence by using the first antenna, the UE resends the random access preamble sequence by using other antennas, thus increasing the success rate of transmitting the random access preamble sequence, and when the layer 2 or layer 3 message fails to be sent for the first time, the UE retransmits the layer 2 or layer 3 message in the multi-antenna polling manner, to further improve the transmission reliability.

Figure 5:
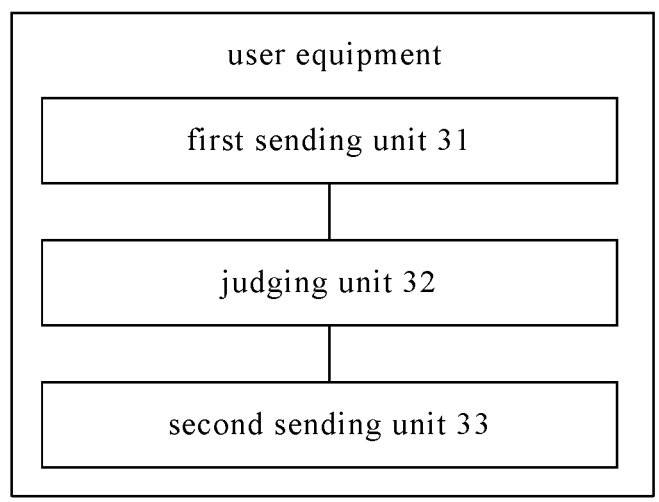
FIG. 5 is a schematic diagram of the composition of a user equipment provided by another embodiment of the present invention.

Another embodiment of the present invention provides a user equipment, as shown in FIG. 5, including: a first sending unit 31, a determining unit 32 and a second sending unit 33.

The first sending unit 31 is configured to send a random access preamble sequence to a base station through a first antenna, so that the base station obtains the antenna number of user equipment (UE) according to the received random access preamble sequence, wherein the first antenna is any antenna of multiple antennas of the UE.

The judging unit 32 is configured to judge whether a random access response sent by the base station is received within a preset time threshold.

The second sending unit 33 is configured to send a layer 2 or layer 3 message to the base station by using multiple antennas according to a preset rule, if the random access response is received.

Further, the first sending unit 31 is further configured to resend the random access preamble sequence to the base station through a second antenna, if the random access response is not received, wherein the second antenna is any antenna in the multiple antennas of the UE excluding the first antenna.

Figure 6:
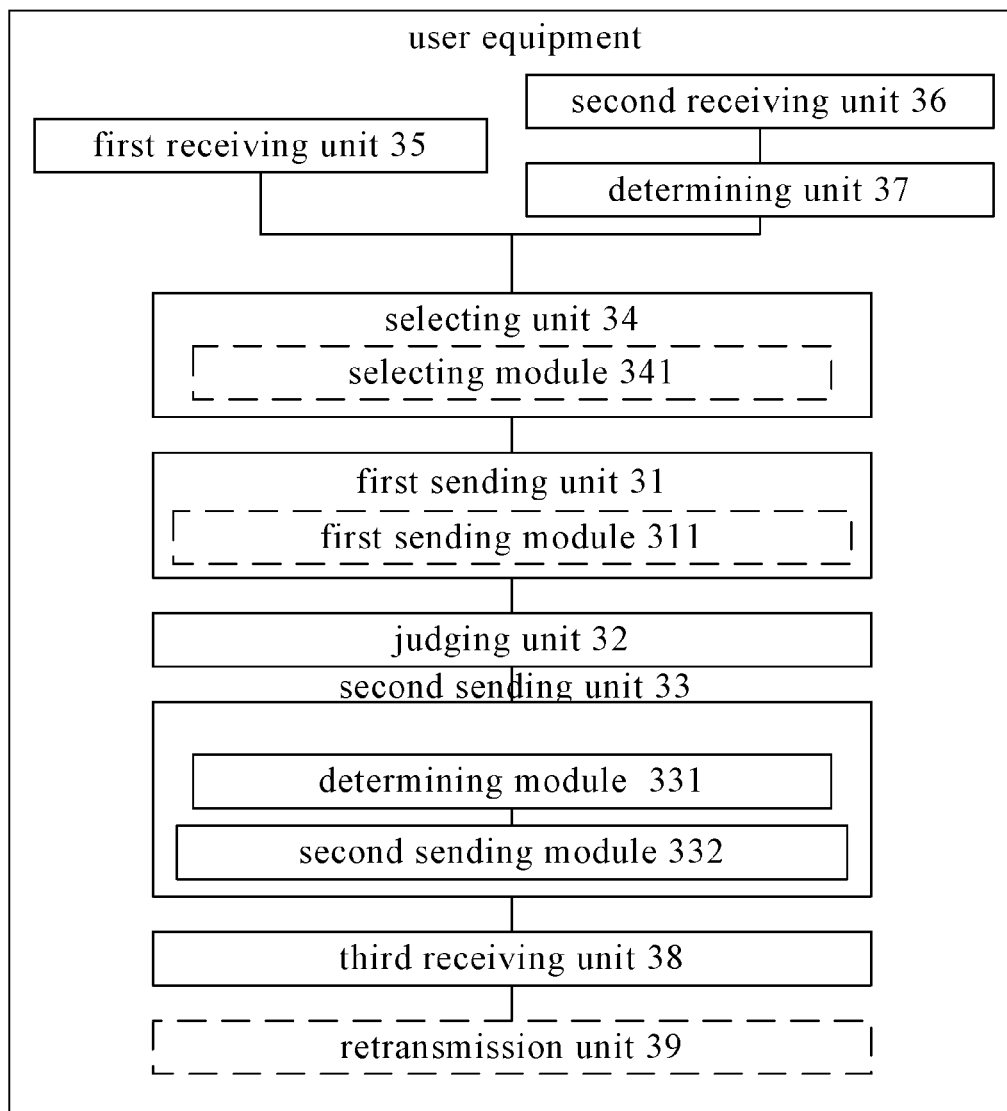
FIG. 6 is a schematic diagram of the composition of another user equipment provided by another embodiment of the present invention.

Further, as shown in FIG. 6, the user equipment may further include a selecting unit 34.

The selecting unit 34 is configured to select the random access preamble sequence from a random access preamble sequence set, before the first sending unit 31 sends the random access preamble sequence to the base station through the first antenna.

Further, the user equipment may further include a first receiving unit 35.

The first receiving unit 35 is configured to receive a first mapping relationship of the antenna number and the random access preamble sequence sent by the base station, before the selecting unit 34 selects the random access preamble sequence from the random access preamble sequence set.

The selecting unit 34 may include a selecting module 341.

The selecting module 341 is configured to determine the random access preamble sequence according to the antenna number of the UE and the first mapping relationship received by the first receiving unit 35.

Further, the user equipment may further include a second receiving unit 36 and a determining unit 37.

The second receiving unit 36 is configured to receive a second mapping relationship of the antenna number and a random access radio network temporary identifier (RA-RNTI) sent by the base station, before the first sending unit 31 sends the random access preamble sequence to the base station through the first antenna.

The determining unit 37 is configured to determine a target RA-RNTI necessary for sending the random access preamble sequence according to the antenna number of the UE and the second mapping relationship received by the second receiving unit 36, so that the UE sends the random access preamble sequence to the base station through the first antenna according to the target RA-RNTI, and the base station determines the antenna number of the UE according to the received random access preamble sequence sent by the UE according to the target RA-RNTI.

Further, the first sending unit 31 may include a first sending module 311.

The first sending module 311 is configured to send a sequence indicating the antenna number of the UE to the base station through the first antenna by carrying the same in the random access preamble sequence.

Further, the second sending unit 33 may include a determining module 331 and a second sending module 332.

The determining module 331 is configured to determine a transmit diversity scheme according to the antenna number of the UE.

The second sending module 332 is configured to send the layer 2 or layer 3 message to the base station by using multiple antennas according to the transmit diversity scheme determined by the determining module 331.

Further, the user equipment may further include a third receiving unit 38.

The third receiving unit 38 is configured to receive an acknowledgement signal sent by the base station, so that the UE obtains that the base station successfully receives the layer 2 or layer 3 message, after the second sending module 332 sends the layer 2 or layer 3 message to the base station by using the multiple antennas according to the transmit diversity scheme.

Further, the third receiving unit 38 is further configured to receive a non-acknowledgement indication signal sent by the base station, after the second sending module 332 send the layer 2 or layer 3 message to the base station by using the multiple antennas according to the transmit diversity scheme.

The user equipment may further include a retransmission unit 39.

The retransmission unit 39 is configured to perform hybrid automatic repeat request (HARQ) transmission of the layer 2 or layer 3 message in a multi-antenna polling manner according to the transmit diversity scheme.

According to the user equipment provided by the embodiment of the present invention, the UE sends the random access preamble sequence to the base station through the first antenna, so that the base station obtains the antenna number of the UE according to the received random access preamble sequence. In this case, the UE judges whether the random access response sent by the base station is received within the preset time threshold, and sends the layer 2 or layer 3 message to the base station by using multiple antennas according to the preset rule if the random access response is received. In this way, the UE sends the layer 2 or layer 3 message to the base station by using the multiple antennas, thus improving the transmission efficiency and reliability of the layer 2 or layer 3 message in the random access process.

Moreover, if the UE fails to send the random access preamble sequence by using the first antenna, the UE resends the random access preamble sequence by using other antennas, thus increasing the success rate of transmitting the random access preamble sequence, and when the layer 2 or layer 3 message fails to be sent for the first time, the UE retransmits the layer 2 or layer 3 message in the multi-antenna polling manner, to further improve the transmission reliability.

Figure 7:
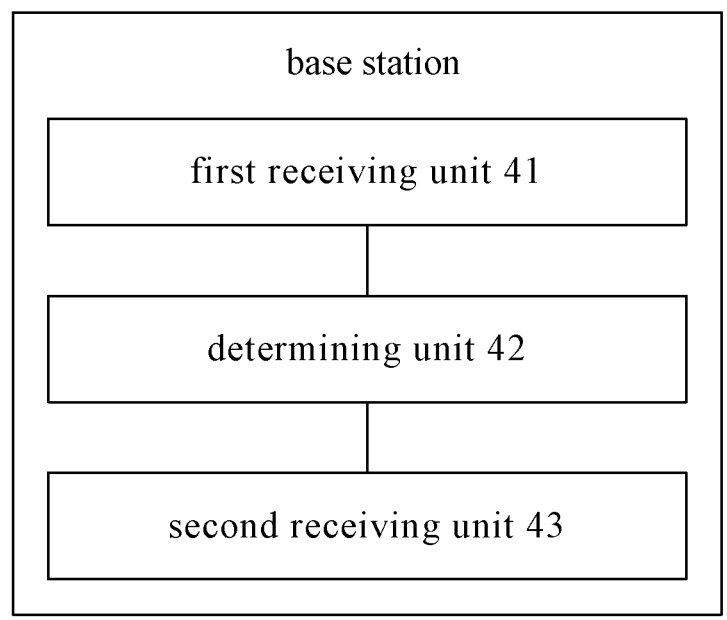
FIG. 7 is a schematic diagram of the composition of a base station provided by another embodiment of the present invention.

Another embodiment of the present invention provides a base station, as shown in FIG. 7, including: a first receiving unit 41, a determining unit 42 and a second receiving unit 43.

The first receiving unit 41 is configured to receive a random access preamble sequence sent by a user equipment (UE).

The determining unit 42 is configured to determine the antenna number of the UE according to the random access preamble sequence received by the first receiving unit 41.

The second receiving unit 43 is configured to receive a layer 2 or layer 3 message sent by the UE through multiple antennas.

Figure 8:
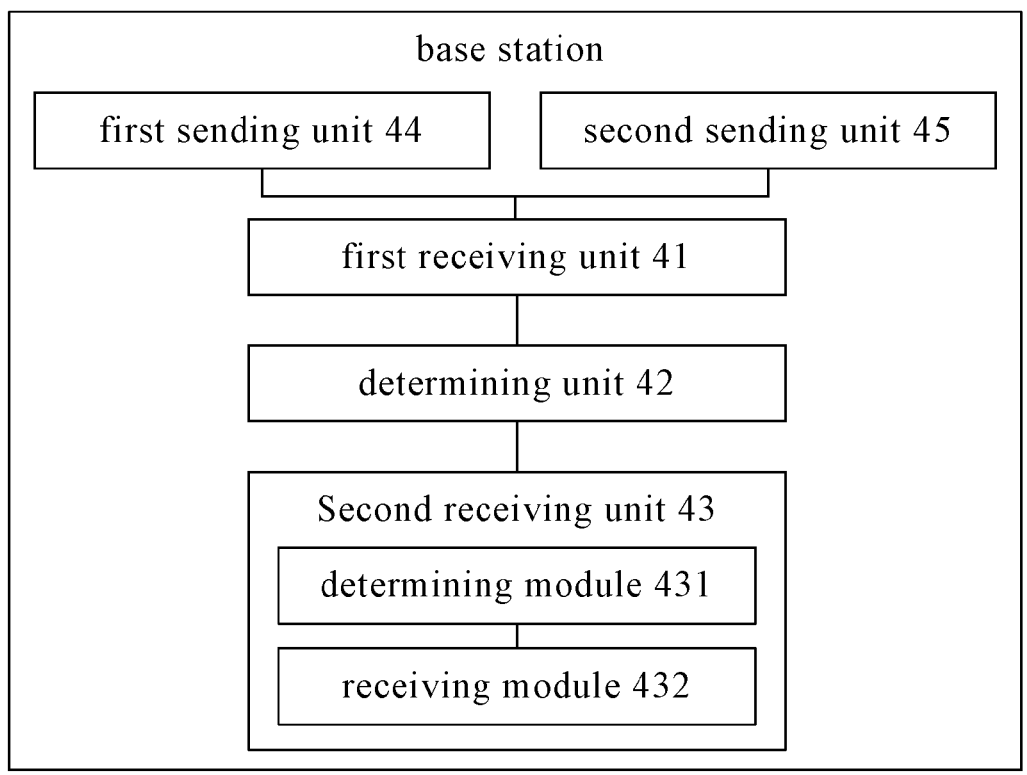
FIG. 8 is a schematic diagram of the composition of another base station provided by another embodiment of the present invention.

Further, as shown in FIG. 8, the base station may further include a first sending unit 44.

The first sending unit 44 is configured to send a first mapping relationship of the antenna number and the random access preamble sequence to the UE, so that the UE determines the random access preamble sequence according to its own antenna number and the first mapping relationship, before the first receiving unit 41 receives the random access preamble sequence sent by the user equipment (UE).

Further, the base station may further include a second sending unit 45.

The second sending unit 45 is configured to send a second mapping relationship of the antenna number and a random access radio network temporary identifier (RA-RNTI) to the UE before the first receiving unit 41 receives the random access preamble sequence sent by the user equipment (UE), so that the UE determines a target RA-RNTI necessary for sending the random access preamble sequence according to its own antenna number and the second mapping relationship, and sends the random access preamble sequence to the base station through the first antenna according to the target RA-RNTI.

Further, the second receiving unit 43 may include: a determining module 431 and a receiving module 432.

The determining module 431 is configured to determine a transmit diversity scheme according to the antenna number of the UE.

The receiving module 432 is configured to receive the layer 2 or layer 3 message sent by the UE through multiple antennas according to the transmit diversity scheme determined by the determining module 431.

According to the base station provided by the embodiment of the present invention, the base station obtains the antenna number of the UE according to the received random access preamble sequence sent by the UE through the first antenna, and receives the layer 2 or layer 3 message sent by the UE through multiple antennas. In this way, the UE sends the layer 2 or layer 3 message to the base station by using the multiple antennas, thus improving the transmission efficiency and reliability of the layer 2 or layer 3 message in the random access process.

Moreover, if the UE fails to send the random access preamble sequence by using the first antenna, the UE resends the random access preamble sequence by using other antennas, thus increasing the success rate of transmitting the random access preamble sequence, and when the layer 2 or layer 3 message fails to be sent for the first time, the UE retransmits the layer 2 or layer 3 message in the multi-antenna polling manner, to further improve the transmission reliability.

Figure 9:
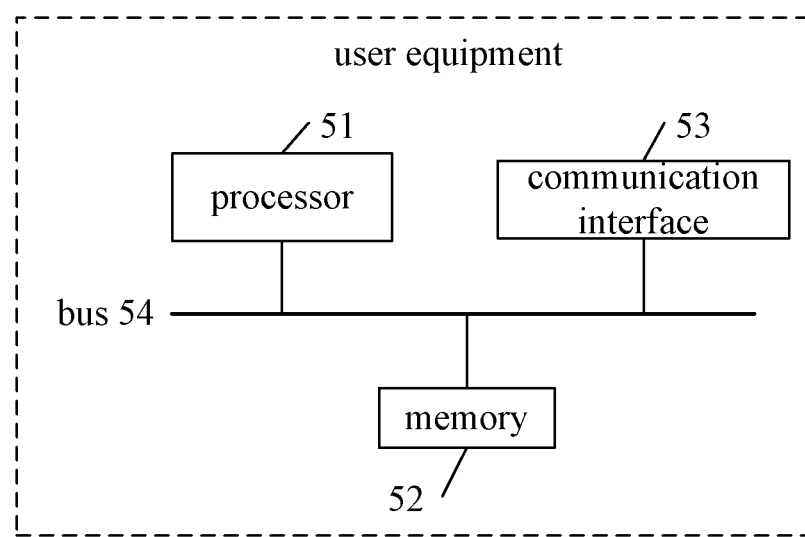
FIG. 9 is a schematic diagram of the composition of still another user equipment provided by another embodiment of the present invention.

Another embodiment of the present invention provides a user equipment, as shown in FIG. 9, including: at least one processor 51, a memory 52, a communication interface 53 and a bus 54. The at least one processor 51, the memory 52 and the communication interface 53 are connected and communicate with each other through the bus 54.

The bus 54 may be an industry standard architecture (Industry Standard Architecture, ISA) bus, a peripheral component interconnection (Peripheral Component, PCI) bus or an extended industry standard architecture (Extended Industry Standard Architecture, EISA) bus, etc. The bus 54 may be divided into an address bus, a data bus, a control bus, etc. For convenience of expression, the bus is only expressed by one thick line in FIG. 9, but it does not indicate that there is only one bus or a type of buses.

The memory 52 is used for storing an executable program code, and the program code includes a computer operating instruction. The memory 52 may include a high-speed RAM memory, as well as a non-volatile memory (non-volatile memory), for example, at least one disk memory.

The processor 51 may be a central processing unit (Central Processing Unit, CPU), or an application specific integrated circuit (Application Specific Integrated Circuit, ASIC), or one or multiple integrated circuits configured to implement the embodiments of the present invention.

The communication interface 53 is mainly configured to achieve the communication between the devices in the embodiment.

The processor 51 is configured to send a random access preamble sequence to a base station through a first antenna, so that the base station obtains the antenna number of a user equipment (UE) according to the received random access preamble sequence, wherein the first antenna is any antenna of multiple antennas of the UE; judge whether a random access response sent by the base station is received within a preset time threshold, and send a layer 2 or layer 3 message to the base station by using multiple antennas according to a preset rule, if the random access response is received.

Further, the processor 51 is further configured to resend the random access preamble sequence to the base station through a second antenna, if the random access response is not received, wherein the second antenna is any antenna in the multiple antennas of the UE excluding the first antenna.

Further, the processor 51 is further configured to select the random access preamble sequence from a random access preamble sequence set, before sending the random access preamble sequence to the base station through the first antenna.

Further, the processor 51 is further configured to receive a first mapping relationship of the antenna number and the random access preamble sequence sent by the base station before selecting the random access preamble sequence from the random access preamble sequence set, and determine the random access preamble sequence according to the antenna number of the UE and the first mapping relationship.

Further, the processor 51 is further configured to receive a second mapping relationship of the antenna number and a random access radio network temporary identifier (RA-RNTI) sent by the base station before sending the random access preamble sequence to the base station through the first antenna, and determine a target RA-RNTI necessary for sending the random access preamble sequence according to the antenna number of the UE and the second mapping relationship, so that the UE sends the random access preamble sequence to the base station through the first antenna according to the target RA-RNTI, and the base station determines the antenna number of the UE according to the received random access preamble sequence sent by the UE according to the target RA-RNTI.

Further, the processor 51 is further configured to send a sequence indicating the antenna number of the UE to the base station through the first antenna by carrying the same in the random access preamble sequence.

Further, the processor 51 is further configured to determine a transmit diversity scheme according to the antenna number of the UE, and send the layer 2 or layer 3 message to the base station by using multiple antennas according to the transmit diversity scheme.

Further, the processor 51 is further configured to receive an acknowledgement signal sent by the base station, so that the UE obtains that the base station successfully receives the layer 2 or layer 3 message, after sending the layer 2 or layer 3 message to the base station by using adopting the multiple antennas according to the transmit diversity scheme.

Further, the processor 51 is further configured to receive a non-acknowledgement indication signal sent by the base station after sending the layer 2 or layer 3 message to the base station by using the multiple antennas according to the transmit diversity scheme, and perform hybrid automatic repeat request (HARQ) transmission of the layer 2 or layer 3 message in a multi-antenna polling manner according to the transmit diversity scheme.

According to the user equipment provided by the embodiment of the present invention, the UE sends the random access preamble sequence to the base station through the first antenna, so that the base station obtains the antenna number of the UE according to the received random access preamble sequence. In this case, the UE judges whether the random access response sent by the base station is received within the preset time threshold, and sends the layer 2 or layer 3 message to the base station by using multiple antennas according to the preset rule if the random access response is received. In this way, the UE sends the layer 2 or layer 3 message to the base station by using multiple antennas, thus improving the transmission efficiency and reliability of the layer 2 or layer 3 message in the random access process.

Moreover, if the UE fails to send the random access preamble sequence by using the first antenna, the UE resends the random access preamble sequence by using other antennas, thus increasing the success rate of transmitting the random access preamble sequence, and when the layer 2 or layer 3 message fails to be sent for the first time, the UE retransmits the layer 2 or layer 3 message in the multi-antenna polling manner, to further improve the transmission reliability.

Figure 10:
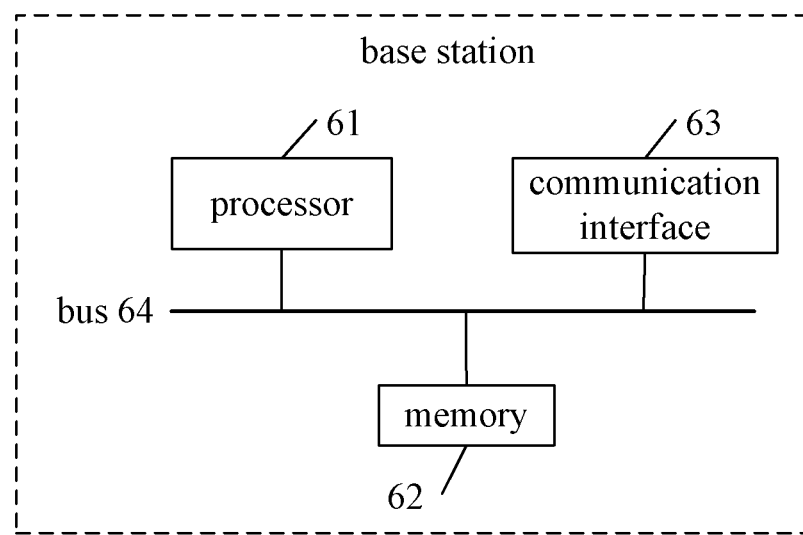
FIG. 10 is a schematic diagram of the composition of still another base station provided by another embodiment of the present invention.

Another embodiment of the present invention provides a base station, as shown in FIG. 10, including: at least one processor 61, a memory 62, a communication interface 63 and a bus 64, and the at least one processor 61, the memory 62 and the communication interface 63 are connected and communicate with each other through the bus 64, wherein:

The bus 64 may be an industry standard architecture (Industry Standard Architecture, ISA) bus, a peripheral component interconnection (Peripheral Component, PCI) bus or an extended industry standard architecture (Extended Industry Standard Architecture, EISA) bus, etc. The bus 64 may be an address bus, a data bus, a control bus, or the like. For convenience of expression, the bus is only expressed by one thick line in FIG. 10, but it does not indicate that there is only one bus or a type of buses.

The memory 62 is used for storing an executable program code, and the program code includes a computer operating instruction. The memory 62 may include a high-speed RAM memory, as well as a non-volatile memory (non-volatile memory), for example, at least one disk memory.

The processor 61 may be a central processing unit (Central Processing Unit, CPU), or an application specific integrated circuit (Application Specific Integrated Circuit, ASIC), or one or multiple integrated circuits configured to implement the embodiments of the present invention.

The communication interface 63 is mainly configured to achieve the communication between the devices in the embodiment.

The processor 61 is configured to receive a random access preamble sequence sent by a user equipment (UE), determine the antenna number of the UE according to the random access preamble sequence and receive a layer 2 or layer 3 message sent by the UE through multiple antennas.

Further, the processor 61 is further configured to send a first mapping relationship of the antenna number and the random access preamble sequence to the UE, so that the UE determines the random access preamble sequence according to its own antenna number and the first mapping relationship, before receiving the random access preamble sequence sent by the user equipment (UE).

Further, the processor 61 is further configured to send a second mapping relationship of the antenna number and a random access radio network temporary identifier (RA-RNTI) to the UE, so that the UE determines a target RA-RNTI necessary for sending the random access preamble sequence according to its own antenna number and the second mapping relationship, and sends the random access preamble sequence to the base station through the first antenna according to the target RA-RNTI, before receiving the random access preamble sequence sent by the user equipment (UE).

Further, the processor 61 is further configured to determine a transmit diversity scheme according to the antenna number of the UE, and receive the layer 2 or layer 3 message sent by the UE through multiple antennas according to the transmit diversity scheme.

According to the base station provided by the embodiment of the present invention, the base station obtains the antenna number of the UE according to the received random access preamble sequence sent by the UE through the first antenna, and receives the layer 2 or layer 3 message sent by the UE through multiple antennas. In this way, the UE sends the layer 2 or layer 3 message to the base station by using the multiple antennas, thus improving the transmission efficiency and reliability of the layer 2 or layer 3 message in the random access process.

Moreover, if the UE fails to send the random access preamble sequence by using the first antenna, the UE resends the random access preamble sequence by using other antennas, thus increasing the success rate of transmitting the random access preamble sequence, and when the layer 2 or layer 3 message fails to be sent for the first time, the UE retransmits the layer 2 or layer 3 message in the multi-antenna polling manner, to further improve the transmission reliability.

By means of the above-mentioned descriptions of the embodiments, those skilled in the art to which the present invention pertains may clearly understand that the present invention may be implemented by software plus necessary universal hardware, and may also be implemented by hardware, but under most conditions, the former is a better embodiment. Based on this understanding, the technical solutions in the present invention essentially or the part contributing to the prior art may be embodied in the form of a software product, the computer software product may be stored in a readable storage medium, such as a floppy disk of a computer, a hard disk or an optical disk or the like, and include several instructions for instructing a computer device (may be a personal computer, a server, or a network device and the like) to perform the methods in the embodiments of the present invention.

The foregoing descriptions are merely specific embodiments of the present invention, rather than limiting the protection scope of the present invention. Any skilled one who is familiar with this art could readily think of variations or substitutions within the disclosed technical scope of the present invention, and these variations or substitutions shall fall within the protection scope of the present invention. Accordingly, the protection scope of the claims should prevail over the protection scope of the present invention.

What is claimed is:

1. A random access method for a user equipment (UE) having a plurality of antennas, comprising:
   receiving a first mapping relationship between a number of antennas and a random access preamble sequence;
   determining the random access preamble sequence according to the number of antennas of the UE and the first mapping relationship;
   sending the random access preamble sequence to a base station through a first antenna, so that the base station obtains the number of antennas of the UE according to the random access preamble sequence, wherein the first antenna is any antenna of the plurality of antennas;
   judging whether a random access response sent by the base station is received within a preset time threshold; and
   sending at least one of a layer 2 message and a layer 3 message to the base station by using multiple antennas according to a preset rule, if the random access response is received within the preset time threshold.

2. The random access method of claim 1, further comprising:
   resending the random access preamble sequence to the base station through a second antenna, if the random access response is not received, wherein the second antenna is any antenna of the multiple antennas of the UE excluding the first antenna.

3. The random access method of claim 1, wherein before the sending the random access preamble sequence to the base station, the method further comprises:
   receiving a second mapping relationship of the number of antennas and a random access radio network temporary identifier (RA-RNTI); and
   determining a target RA-RNTI necessary for sending the random access preamble sequence according to the number of antennas of the UE and the second mapping relationship, so that the UE sends the random access preamble sequence to the base station through the first antenna according to the target RA-RNTI, and the base station determines the number of antennas of the UE according to the random access preamble sequence which is sent by the UE according to the target RA-RNTI.

4. The random access method of claim 1, wherein the random access preamble sequence carries a sequence used for indicating the number of antennas of the UE.

5. The random access method of claim 1, wherein the sending at least one of a layer 2 message and a layer 3 message comprises:
   determining a transmit diversity scheme according to the number of antennas of the UE; and
   sending the at least one of the layer 2 message and the layer 3 message to the base station by using the multiple antennas according to the transmit diversity scheme.

6. The random access method of claim 5, wherein after the sending the at least one of the layer 2 message the layer 3 message to the base station by using the multiple antennas according to the transmit diversity scheme, the method further comprises:
   receiving an acknowledgement signal sent by the base station, so that the UE obtains that the base station successfully receives the at least one of the layer 2 message and the layer 3 message.

7. The random access method of claim 5, wherein after the sending the at least one of the layer 2 message and the layer 3 message to the base station by using the multiple antennas according to the transmit diversity scheme, the method further comprises:
   receiving a non-acknowledgement indication signal sent by the base station; and
   performing hybrid automatic repeat request (HARQ) transmission of the at least one of the layer 2 message and the layer 3 message in a multi-antenna polling manner according to the transmit diversity scheme.

8. A random access method, comprising:
   receiving a random access preamble sequence sent by a user equipment (UE);
   determining how many antennas the UE has based on the random access preamble sequence;
   determining a transmit diversity scheme according to the number of antenna of the UE; and
   receiving the at least one of the layer 2 message and the layer 3 message sent by the UE through multiple antennas according to the transmit diversity.

9. The random access method of claim 8, wherein before the receiving the random access preamble sequence sent by the user equipment (UE), the method further comprises:
sending a first mapping relationship of the number of antennas and the random access preamble sequence to the UE, so that the UE determines the random access preamble sequence according to its own number of antennas and the first mapping relationship.

10. The random access method of claim 8, wherein before the receiving the random access preamble sequence sent by the user equipment (UE), the method further comprises:
sending a second mapping relationship of the number of antennas and a random access radio network temporary identifier (RA-RNTI) to the UE, so that the UE determines a target RA-RNTI necessary for sending the random access preamble sequence according to its own number of antennas and the second mapping relationship, and send the random access preamble sequence to the base station through the first antenna according to the target RA-RNTI.

11. A user equipment (UE), comprising:
a processor, a memory, a communication interface and a bus;
wherein the processor, the memory and the communication interface are connected and communicate with each other through the bus; and
wherein the processor is configured to:
receive a first mapping relationship between a number of antennas and a random access preamble sequence;
determine the random access preamble sequence according to the number of antennas of the UE and the first mapping relationship;
send the random access preamble sequence to a base station through a first antenna, so that the base station obtains the number of antennas of the UE according to the random access preamble sequence, wherein the first antenna is any antenna of multiple antennas of the UE;
judge whether a random access response sent by the base station is received within a preset time threshold; and
send at least one of a layer 2 message and a layer 3 message to the base station by using multiple antennas according to a preset rule, if the random access response is received.

12. The user equipment of claim 11, wherein,
the processor is further configured to resend the random access preamble sequence to the base station through a second antenna, if the random access response is not received, wherein the second antenna is any antenna of the multiple antennas of the UE excluding the first antenna.

13. The user equipment of claim 11, wherein the processor is further configured to select the random access preamble sequence from a random access preamble sequence set, before sending the random access preamble sequence to the base station through the first antenna.

14. The user equipment of claim 13, wherein
the processor is further configured to:
receive a second mapping relationship of the number of antennas and a random access radio network temporary identifier (RA-RNTI) sent by the base station, before the processor sends the random access preamble sequence to the base station through the first antenna; and
determine a target RA-RNTI necessary for sending the random access preamble sequence according to the number of antennas of the UE and the second mapping relationship, so that the UE sends the random access preamble sequence to the base station through the first antenna according to the target RA-RNTI, and the base station determines the number of antennas of the UE according to the random access preamble sequence which is sent by the UE according to the target RA-RNTI.

15. The user equipment of claim 13, wherein the random access preamble sequence carries a sequence used for indicating the number of antennas of the UE.

16. The user equipment of claim 11, wherein the processor is further configured to:
determine a transmit diversity scheme according to the number of antennas of the UE; and
send the at least one of the layer 2 message and the layer 3 message to the base station by using multiple antennas according to the transmit diversity scheme.

* * * * *